United States Patent
Lee et al.

(10) Patent No.: US 9,983,406 B2
(45) Date of Patent: May 29, 2018

(54) DISPLAY APPARATUS AND OPERATING METHOD OF DISPLAY APPARATUS

(71) Applicant: Samsung Electronics Co., Ltd., Suwon-si, Gyeonggi-do (KR)

(72) Inventors: Seok Lee, Hwaseong-si (KR); Jingu Heo, Yongin-si (KR); Dong Kyung Nam, Yongin-si (KR); Juyong Park, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 180 days.

(21) Appl. No.: 14/830,331

(22) Filed: Aug. 19, 2015

(65) Prior Publication Data

US 2016/0057412 A1 Feb. 25, 2016

(30) Foreign Application Priority Data

Aug. 20, 2014 (KR) .................. 10-2014-0108494

(51) Int. Cl.
  *G02B 27/00* (2006.01)
  *H04N 13/00* (2018.01)
  *H04N 13/04* (2006.01)
(52) U.S. Cl.
  CPC ..... *G02B 27/0093* (2013.01); *H04N 13/0022* (2013.01); *H04N 13/0033* (2013.01); *H04N 13/0468* (2013.01); *H04N 13/0404* (2013.01)

(58) Field of Classification Search
  CPC .......... G02B 27/0093; H04N 13/0022; H04N 13/0033; H04N 13/0468; H04N 13/0404
  See application file for complete search history.

(56) References Cited

U.S. PATENT DOCUMENTS

| | | | |
|---|---|---|---|
| 2011/0128356 A1 | 6/2011 | de la Barre et al. | |
| 2011/0292190 A1* | 12/2011 | Kim .................. | H04N 13/0022 348/54 |
| 2012/0200676 A1* | 8/2012 | Huitema ............ | H04N 13/0022 348/51 |
| 2013/0076738 A1 | 3/2013 | Jian et al. | |
| 2014/0176676 A1* | 6/2014 | Lin .................... | H04N 13/0472 348/46 |

FOREIGN PATENT DOCUMENTS

| | | |
|---|---|---|
| JP | 4979136 B2 | 7/2012 |
| KR | 20120075829 A | 7/2012 |
| KR | 101249988 B1 | 4/2013 |
| KR | 20130098023 A | 9/2013 |
| KR | 20130116075 A | 10/2013 |
| KR | 2014-0025784 A | 3/2014 |

* cited by examiner

*Primary Examiner* — Nam Pham
(74) *Attorney, Agent, or Firm* — Harness, Dickey & Pierce, P.L.C.

(57) ABSTRACT

An operating method of a display apparatus includes calculating a range of a movement of a user based on eye movement information indicating movements of eyes of the user; and adjusting a stereoscopic depth of a three-dimensional (3D) image based on the range of the movement.

14 Claims, 10 Drawing Sheets

DISPLAY APPARATUS AND OPERATING METHOD OF DISPLAY APPARATUS

CROSS-REFERENCE TO RELATED APPLICATION

This application claims the priority benefit of Korean Patent Application No. 10-2014-0108494, filed on Aug. 20, 2014, in the Korean Intellectual Property Office, the entire contents of which are incorporated herein by reference.

BACKGROUND

1. Field

At least some example embodiments relate to a display apparatus and an operating method of the display apparatus, and more particularly, to a method of preventing an image quality from being degraded due to a visual artifact occurring when a user moves, in a display apparatus for providing a three-dimensional (3D) image. The display apparatus may include, for example, a television (TV), or a personal electronic device.

2. Description of the Related Art

In an eye-tracking three-dimensional (3D) display, eye positions of a user may be tracked, and pixel values may be rendered in real time so that a left eye image and a right eye image may appear to be separate in the tracked positions.

SUMMARY

However, during eye tracking, a latency of a system may occur due to a period of time required to acquire a camera image, a period of time required to calculate the eye positions, a period of time required to generate image content of the eyes, and a period of time required to render each of pixel values of a display.

The latency may cause a difference between actual eye positions of the user and eye positions intended for rendering. As a result, an image quality may be degraded, for example, due to a crosstalk in which eye images appear to be mixed together. Because the difference increases especially when the user moves, the user may experience a greater degradation in the image quality.

At least some example embodiments relate to an operating method of a display apparatus.

In at least some example embodiments, the operating method may include calculating a range of a movement of a user based on eye movement information indicating movements of eyes of the user, and adjusting a stereoscopic depth of a three-dimensional (3D) image based on the range of the movement.

The eye movement information may include at least one of eye position information of the eyes or eye movement speed information of the eyes.

The adjusting may include adjusting the stereoscopic depth of the 3D image by adjusting a disparity between a left eye image and a right eye image provided to the user.

The adjusting may include reducing the disparity between the left eye image and the right eye image in response to the range of the movement increasing.

The adjusting may include reducing the disparity between the left eye image and the right eye image at a preset ratio based on a rate of an increase in the range of the movement.

The operating method may further include changing a 3D image rendering scheme to a two-dimensional (2D) image rendering scheme when the range of the movement exceeds a preset threshold.

The threshold may be set based on at least one of a latency caused by eye tracking to acquire the eye movement information, a latency caused by generation of a left eye image and a right eye image to provide a 3D effect, or a latency caused by the 3D image rendering scheme.

Other example embodiments relate to an operating method of a display apparatus.

In some example embodiments, the operating method may include determining whether a user moves based on eye movement information indicating movements of eyes of the user, and selecting either a 3D image rendering scheme or a 2D image rendering scheme based on whether the user moves.

The eye movement information may include at least one of eye position information of the eyes or eye movement speed information of the eyes.

The eye position information may include at least one of a variance value of a position vector of the eyes or a variance value of a horizontal position vector of the eyes, and the eye movement speed information may include at least one of a magnitude of a movement velocity vector of the eyes or a magnitude of a horizontal movement velocity vector of the eyes.

The determining may include comparing a threshold to at least one of the eye position information and the eye movement speed information and determining whether the user moves based on the comparison.

The threshold may be set differently for each of the eye position information and the eye movement speed information, based on at least one of a latency caused by eye tracking to acquire the eye movement information, a latency caused by generation of a left eye image and a right eye image to provide a 3D effect, or a latency caused by the 3D image rendering scheme.

The selecting may include selecting the 2D image rendering scheme when the user moves, and selecting the 3D image rendering scheme when the user does not move.

Other example embodiments relate to a display apparatus.

In some example embodiments, the display apparatus may include a movement range calculator configured to calculate a range of a movement of a user based on eye movement information on movements of eyes of the user, and a stereoscopic depth adjuster configured to adjust a stereoscopic depth of a 3D image based on the range of the movement.

The stereoscopic depth adjuster may be configured to adjust the stereoscopic depth of the 3D image by adjusting a disparity between a left eye image and a right eye image provided to the user.

The stereoscopic depth adjuster may be configured to reduce the disparity between the left eye image and the right eye image in response to the range of the movement increasing.

The display apparatus may further include a renderer configured to change a 3D image rendering scheme to a 2D image rendering scheme when the range of the movement exceeds a preset threshold.

The threshold may be set based on at least one of a latency caused by eye tracking to acquire the eye movement information, a latency caused by generation of a left eye image and a right eye image to provide a 3D effect, or a latency caused by the 3D image rendering scheme.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
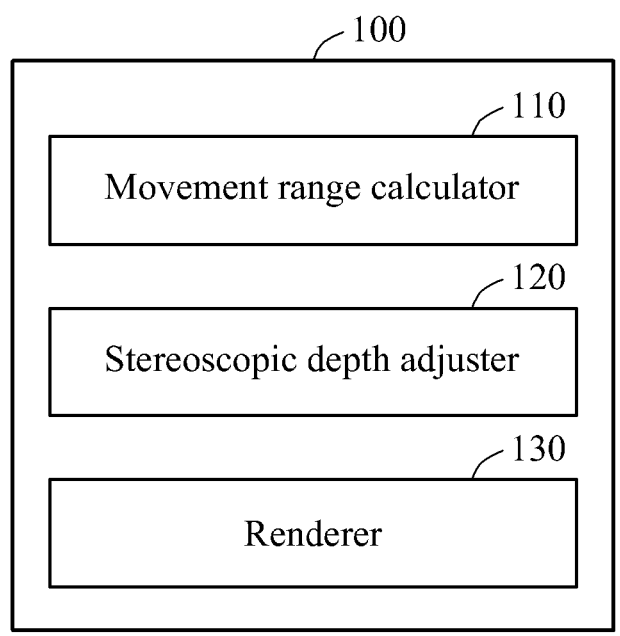
FIG. 1 is a block diagram illustrating an example of a configuration of a display apparatus according to at least some example embodiments.

Reference will now be made in detail to one or more example embodiments, illustrated in the accompanying drawings, wherein like reference numerals refer to like elements throughout. In this regard, example embodiments of the present disclosure may be embodied in many different forms and should not be construed as being limited to example embodiments set forth herein. Accordingly, example embodiments are merely described below, by referring to the figures, to explain aspects of the present disclosure.

In addition, terms used herein are selected from terms generally understood by one of ordinary skill in the related art, but may have different meanings according to technical developments and/or changes, practices, and preferences of an engineer. Accordingly, the terms used herein should not be construed as limiting the technical spirit, and should be construed as illustrative terms used merely to describe example embodiments.

As used herein, unless stated otherwise, the phrases "at least one of A, B and C" and "at least one of A, B or C" are defined as referring to: only A, only B, only C, or any combination of two or more elements selected from the group [A, B, C]. While the present example phrase includes language directed to a group including only 3 elements for the purpose of illustration, the same definition above applies to phrases including language directed to groups including only two elements (i.e., [A, B]) or more than three elements (i.e., [A, B, C, D]).

FIG. 1 is a block diagram illustrating a configuration of a display apparatus 100 according to at least some example embodiments.

Referring to FIG. 1, the display apparatus 100 may include a movement range calculator 110, a stereoscopic depth adjuster 120 and a renderer 130. According to at least some example embodiments, the display apparatus 100 may be an electronic device having a screen that displays images to a user (e.g., a television, computer display, mobile phone, or personal electronic device).

The movement range calculator 110 may calculate a range of a movement of a user based on eye movement information on movements of eyes of the user. The discussion of movement herein (e.g., with reference to a user, and eye, or eyes) may refer to relative movement (e.g., movement relative to a camera, screen, and/or display apparatus). A glasses-free three-dimensional (3D) display apparatus may track a left eye position and a right eye position of the user, and may provide a left eye image and a right eye image in the tracked left eye position and the tracked right eye position. However, when the user moves, an actual left eye position and an actual right eye position of the user may be different from positions in which a left eye image and a right eye image intended for actual rendering are provided.

Due to the above difference, crosstalk may occur, which may lead to a degradation in an image quality. The crosstalk may refer to a phenomenon in which a left eye image and a right eye image provided to a user appear to be mixed together. Accordingly, an image rendering scheme may need to be provided to calculate a range of a movement of a user based on eye movement information and to prevent a degradation in an image quality based on the range of the movement.

The eye movement information may include at least one of eye position information of the eyes and eye movement speed information of the eyes. The movement range calculator 110 may calculate the range of the movement based on at least one of the eye position information and the eye movement speed information.

In an example, the range of the movement may be calculated based on eye position information in previous frames and eye position information in a current frame. In another example, the range of the movement may be calculated using eye movement speed information based on eye position information.

The stereoscopic depth adjuster 120 may adjust a stereoscopic depth of a 3D image based on the range of the movement calculated by the movement range calculator 110. The stereoscopic depth adjuster 120 may provide the 3D image with the adjusted stereoscopic depth and accordingly, it is possible to prevent an image quality from being degraded, for example, due to crosstalk.

The stereoscopic depth adjuster 120 may adjust the stereoscopic depth of the 3D image by adjusting a disparity between the left eye image and the right eye image. Generally, a display apparatus for providing a 3D image may provide a left eye image and a right eye image, and a disparity between the left eye image and the right eye image may be determined based on a distance between a left eye and a right eye of a user. Accordingly, the user may recognize an image with the same stereoscopic depth as that in a real life.

However, when the display apparatus provides the left eye image and the right eye image, a reference or, alternatively, predetermined latency may occur. For example, the latency may occur due to a period of time required to acquire the left eye image and the right eye image, a period of time required to calculate eye positions of the user, a period of time required to generate the left eye image and the right eye image and a period of time required to render each pixel value of a display.

For example, when it is determined that a user is substantially stationary due to a small range of a movement of the user, an image quality may not be degraded due to crosstalk, because of a small difference between actual eye positions of the user and eye positions intended for rendering. However, when the range of the movement increases, the difference may increase, which may cause a degradation in the image quality due to crosstalk.

Accordingly, the stereoscopic depth adjuster 120 may reduce a period of time required to generate the left eye image and the right eye image by adjusting the disparity between the left eye image and the right eye image. Thus, it is possible to reduce a difference between actual eye positions of the user and eye positions intended for rendering.

The stereoscopic depth adjuster 120 may adjust the stereoscopic depth to be reduced by reducing the disparity between the left eye image and the right eye image, in response to the range of the movement increasing. For example, the disparity between the left eye image and the right eye image may be reduced by reducing a gap between virtual cameras based on the actual eye positions.

The stereoscopic depth adjuster 120 may reduce the disparity between the left eye image and the right eye image at a ratio set in advance based on a rate of an increase in the range of the movement (e.g., of the eyes). When the range of the movement increases, a difference between actual eye positions of the user and eye positions intended for rendering may increase. Accordingly, the disparity between the left eye image and the right eye image may be reduced at the preset ratio based on the difference determined based on the rate of the increase in the range of the movement so as to prevent a degradation in the image quality due to crosstalk.

As described above, the stereoscopic depth adjuster 120 may adjust the stereoscopic depth based on the range of the movement and thus, it is possible to prevent the image quality from being degraded due to crosstalk. However, when the range of the movement exceeds a preset threshold, the degradation in the image quality due to crosstalk may not be prevented or, alternatively, reduced to a desirable level, only by adjusting the stereoscopic depth.

For example, when the range of the movement exceeds the preset threshold, the renderer 130 may change a 3D image rendering scheme to a 2D image rendering scheme. The 2D image rendering scheme may be an image rendering scheme of providing an image that does not have a stereoscopic depth, that is, a disparity between a left eye image and a right eye image. Through the 2D image rendering scheme, it is possible to prevent an image quality from being degraded due to crosstalk, even though a 3D image is not provided to a user.

A threshold may be set based on at least one of a latency caused by eye tracking to acquire the eye movement information, a latency caused by generation of a left eye image and a right eye image to provide a 3D effect, and a latency caused by the 3D image rendering scheme. The eye movement information may include a period of time desired or, alternatively, required to acquire a camera image, and a period of time desired or, alternatively, required to calculate eye positions.

The above-described latencies may cause a difference between actual eye positions of the user and eye positions intended for rendering and as a result, the image quality may be degraded due to crosstalk. When the range of the movement is equal to or greater than the preset threshold, a quality of a provided 3D image may be degraded. Accordingly, when the range of the movement exceeds a limit of the difference that may be reduced by adjusting the stereoscopic depth, a 2D image may be provided so as to prevent a degradation in the image quality.

As described above, when the range of the movement exceeds the preset threshold, the display apparatus 100 may change an image rendering scheme to the 2D image rendering scheme, instead of the 3D image rendering scheme, using the renderer 130. Thus, it is possible to prevent an image quality from being degraded due to crosstalk, instead of providing a 3D image.

Figure 2:
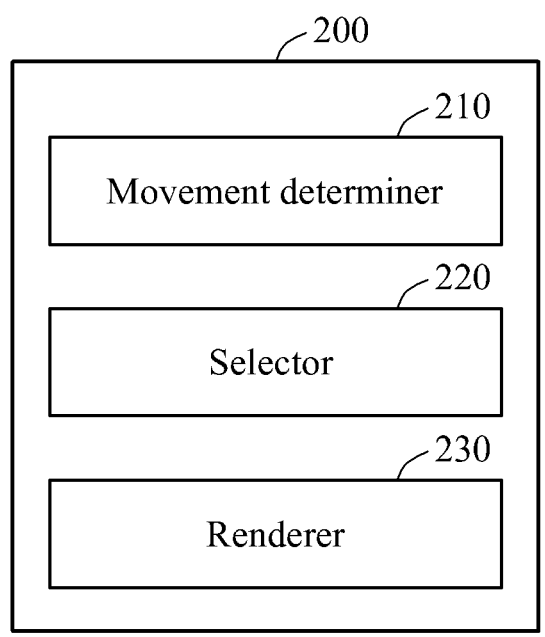
FIG. 2 is a block diagram illustrating another example of a configuration of a display apparatus according to at least some example embodiments.

FIG. 2 is a block diagram illustrating a configuration of a display apparatus 200 according to at least some example embodiments.

Referring to FIG. 2, the display apparatus 200 may include a movement determiner 210, a selector 220 and a renderer 230. According to at least some example embodiments, the display apparatus 100 may be an electronic device having a screen that displays images to a user (e.g., a television, computer display, mobile phone, or personal electronic device).

The movement determiner 210 may determine whether a user moves based on eye movement information on movements of eyes of the user. For example, the movement determiner 210 may determine whether the user is substantially stationary or moving, based on the eye movement information.

As described above with reference to FIG. 1, when the user is moving, actual eye positions of the user may be different from eye positions intended for rendering. Due to the above difference, an image quality may be degraded due to crosstalk in which a left eye image and a right eye image appear to be mixed together.

To prevent a degradation in the image quality, the movement determiner 210 may determine whether the user moves, and the selector 220 may select either a 2D image rendering scheme or a 3D image rendering scheme based on whether the user moves.

The eye movement information used by the movement determiner 210 to determine whether the user moves may include at least one of eye position information of the eyes and eye movement speed information of the eyes.

The eye position information may include at least one of a variance value of a position vector of the eyes and a variance value of a horizontal position vector of the eyes. The eye movement speed information may include at least one of a magnitude of a movement velocity vector of the eyes and a magnitude of a horizontal movement velocity vector of the eyes.

The movement determiner 210 may set thresholds in advance for each of the eye position information and the eye movement speed information. The movement determiner 210 may compare at least one of the eye position information and the eye movement speed information to a threshold for each of at least one of the eye position information and the eye movement speed information, and may determine whether the user moves.

The thresholds may be set based on at least one of a latency caused by eye tracking to acquire the eye movement information, a latency caused by generation of a left eye image and a right eye image to provide a 3D effect, and a latency caused by the 3D image rendering scheme. The eye movement information may include a period of time desired or, alternatively, required to acquire a camera image, and a period of time desired or, alternatively, required to calculate eye positions.

In an example, when the eye position information exceeds a threshold for the eye position information, the user may be determined to be moving. In another example, when the eye position information is equal to or less than the threshold for the eye position information, the user may be determined to be substantially stationary.

The selector 220 may select either the 2D image rendering scheme or the 3D image rendering scheme, based on whether the user moves determined by the movement determiner 210. For example, when the user moves, the selector 220 may select the 2D image rendering scheme. When the user does not move, the selector 220 may select the 3D image rendering scheme.

The above-described latencies may cause a difference between actual eye positions of the user and eye positions intended for rendering and as a result, the image quality may be degraded due to crosstalk. When the range of the movement is equal to or greater than a preset threshold, a quality of a provided 3D image may be degraded. Accordingly, when it is determined that the user is moving, a 2D image may be provided so as to prevent a degradation in the image quality.

The renderer 230 may render an image using an image rendering scheme selected by the selector 220, and may provide the rendered image to the user. For example, when the user is stationary, the renderer 230 may apply the 3D image rendering scheme to an image, and may provide the image to the user. When the user is moving, the renderer 230 may apply the 2D image rendering scheme to an image, and may provide the image to the user.

As described above, when it is determined that the user is moving, the display apparatus 200 may select the 2D image rendering scheme, instead of the 3D image rendering scheme, using the selector 220. Thus, it is possible to prevent an image quality from being degraded due to crosstalk, instead of providing a 3D image.

Though at least some example embodiments are discussed herein with reference to a "preset threshold", example embodiments are not limited to the preset threshold, and a variable threshold may be used in addition to, or in place of, to the preset threshold. The variable threshold may be set, for example by the display device 100 or 200 during use of the display device 100 or 200, based on, for example, information gathered by the display device 100 or 200.

Figure 3:
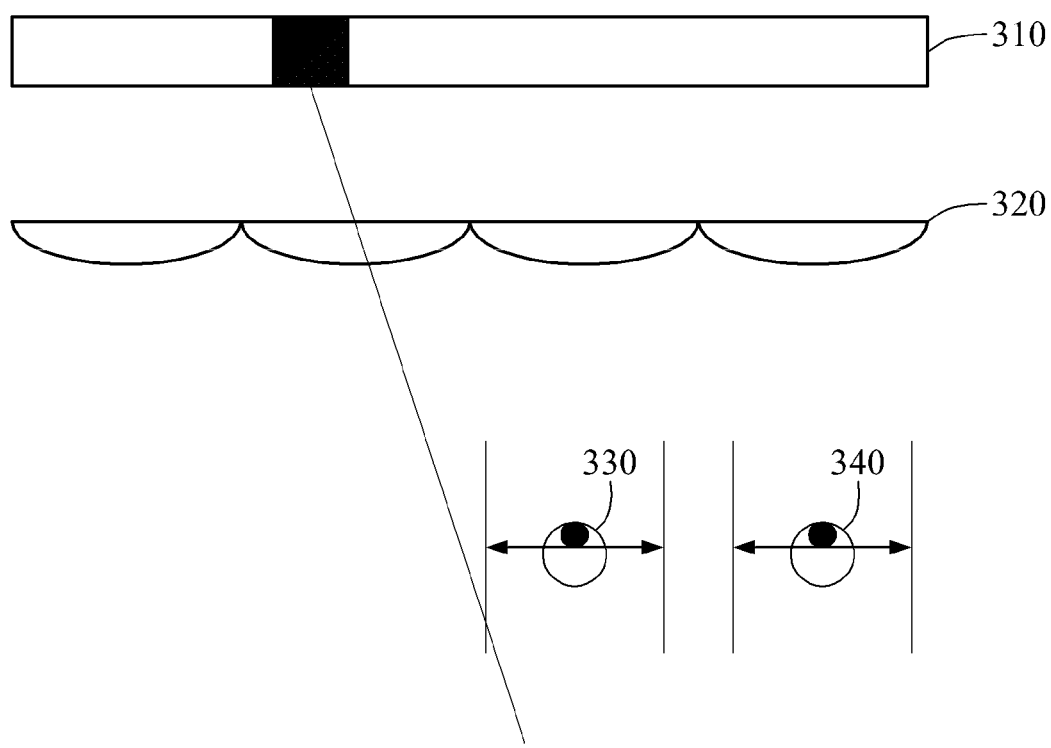
FIG. 3 is a diagram provided to explain an example of a rendering method when a user is stationary according to at least some example embodiments.

FIG. 3 is a diagram provided to explain an example of a rendering method when a user is stationary according to at least some example embodiments.

Referring to FIG. 3, when the user is stationary, a left eye image and a right eye image provided by a panel 310 may be transferred by an optical unit 320 to a position of a left eye 330 and a position of a right eye 340. The panel 310 may include a plurality of pixels.

When the user is stationary, a range corresponding to the left eye 330 or the right eye 340 may be set based on the position of the left eye 330 and the position of the right eye 340. The left eye image and the right eye image may be provided using pixels that correspond to the range and/or are in the range. The pixels may be shaded.

Figure 4:
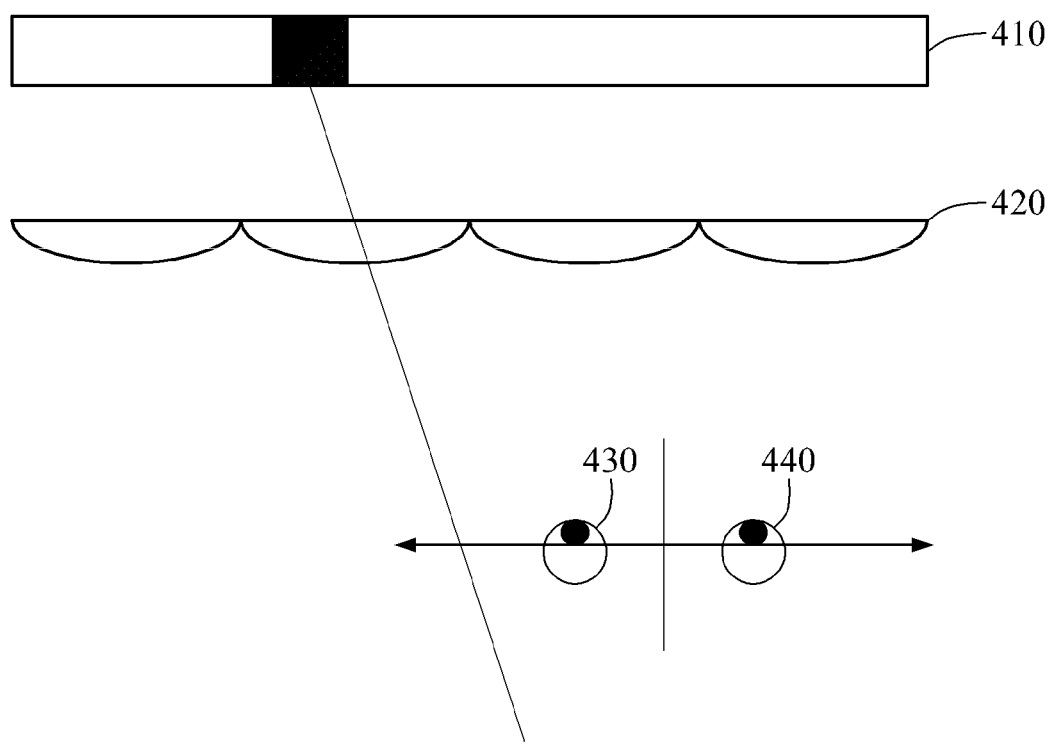
FIG. 4 is a diagram provided to explain an example of a rendering method when a user is moving according to at least some example embodiments.

FIG. 4 is a diagram provided to explain an example of a rendering method when a user is moving according to at least some example embodiments.

Referring to FIG. 4, when the user is moving, a left eye image and a right eye image provided by a panel 410 may be transferred by an optical unit 420 based on a center between a left eye 430 and a right eye 440. The panel 410 may include a plurality of pixels.

When the user is moving, which one of the left eye 430 and the right eye 440 a pixel is closer to, based on the center between the left eye 430 and the right eye 440, may be determined. The left eye image and the right eye image may be provided using pixels corresponding to the left eye 430 or the right eye 440. The pixels may be shaded.

As described above with reference to FIGS. 3 and 4, whether the user moves may be determined, and different pixels used to provide a left eye image and a right eye image may be selected and provided based on whether the user is stationary or moving.

Figure 5:
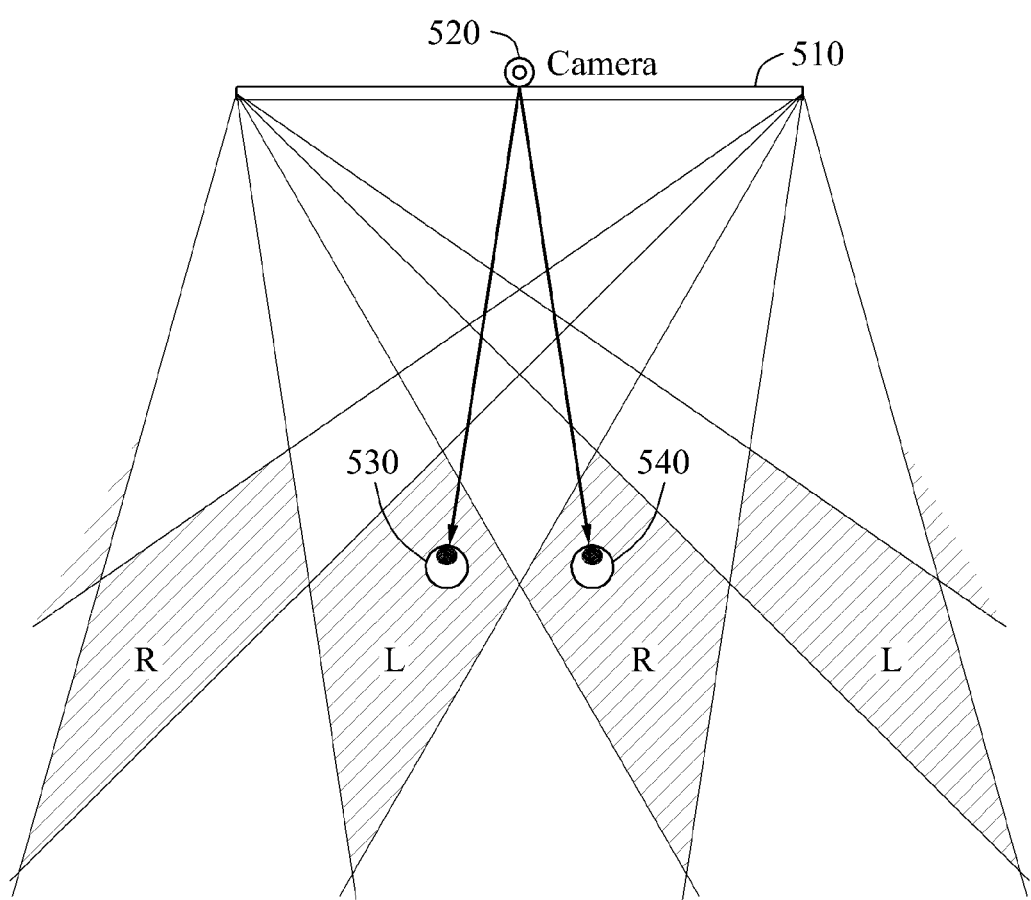
FIG. 5 is a diagram provided to explain another example of a rendering method when a user is stationary according to at least some example embodiments.

FIG. 5 is a diagram provided to explain another example of a rendering method when a user is stationary according to at least some example embodiments.

Referring to FIG. 5, when the user is stationary or when a range of a movement of the user is equal to or less than a preset threshold, a display apparatus 510 may provide a left eye image and a right eye image to a left eye 530 and a right eye 540 of the user. A disparity between the provided left eye image and the provided right eye image may exist.

The display apparatus 100 of FIG. 1 may calculate the range of the movement based on eye movement information acquired using a camera 520. The display apparatus 100 may adjust a stereoscopic depth based on the range of the movement and may provide a 3D image.

When the range of the movement increases, a difference between actual eye positions of the user and eye positions intended for rendering may increase, which may cause a degradation in an image quality due to crosstalk.

The display apparatus 100 may adjust the disparity between the left eye image and the right eye image and may reduce a period of time required to generate the left eye image and the right eye image. Accordingly, the difference between the actual eye positions and the eye positions intended for rendering may be reduced.

When it is determined that the user is moving based on the eye movement information acquired using the camera 520, the display apparatus 200 of FIG. 2 may select a 2D image rendering scheme and may provide a 2D image to the left eye 530 and the right eye 540. The 2D image may not have a stereoscopic depth, that is, a disparity may not exist.

When the range of the movement is equal to or greater than the preset threshold, a quality of a provided 3D image may be degraded. When it is determined that the user is moving, a 2D image may be provided so as to prevent a degradation in an image quality.

Figure 6:
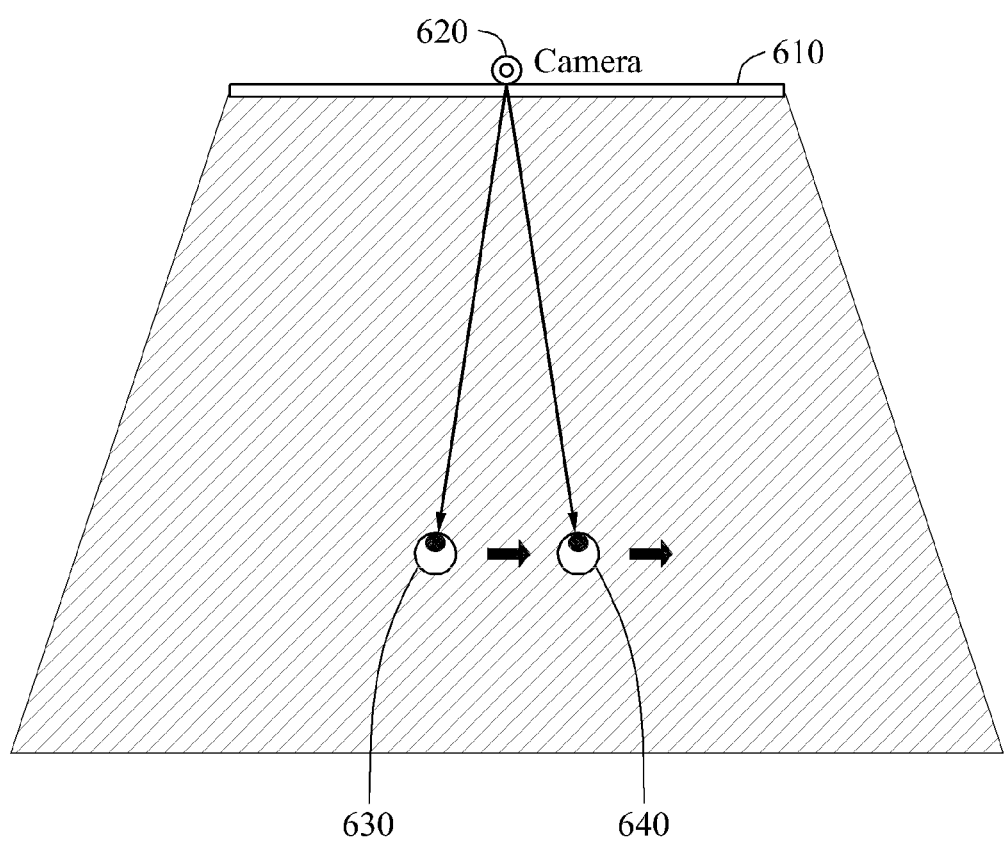
FIG. 6 is a diagram provided to explain another example of a rendering method when a user is moving according to at least some example embodiments.

FIG. 6 is a diagram provided to explain another example of a rendering method when a user is moving according to at least some example embodiments.

Referring to FIG. 6, when the user is moving or when a range of a movement of the user exceeds a preset threshold, a display apparatus 610 may provide the same images to a left eye 630 and a right eye 640 of the user.

As described above, when the user is moving, an image quality may be degraded due to crosstalk caused by a difference between actual eye positions of the user and eye positions intended for rendering.

The display apparatus 100 of FIG. 1 may calculate the range of the movement based on eye movement information acquired using a camera 620. The display apparatus 100 may adjust a stereoscopic depth based on the range of the movement and may provide a 3D image. However, when the range of the movement exceeds the preset threshold, a degradation in an image quality may not be prevented or, alternatively, reduced to a desirable level, only by adjusting the stereoscopic depth.

Accordingly, when the range of the movement exceeds the preset threshold, the display apparatus 200 of FIG. 2 may change a 3D image rendering scheme to a 2D image rendering scheme. The display apparatus 200 may provide a 2D image and thus, it is possible to prevent the image quality from being degraded due to crosstalk caused by a difference between actual eye positions of the user and eye positions intended for rendering.

When it is determined that the user is moving based on the eye movement information acquired using the camera 620, the display apparatus 200 may select the 2D image rendering scheme and may provide the same 2D images to the left eye 630 and the right eye 640. The 2D images may not have a stereoscopic depth, that is, a disparity may not exist.

When the range of the movement is equal to or greater than the preset threshold, a quality of a provided 3D image may be degraded. When it is determined that the user is moving, a 2D image may be provided so as to prevent a degradation in an image quality.

Figure 7:
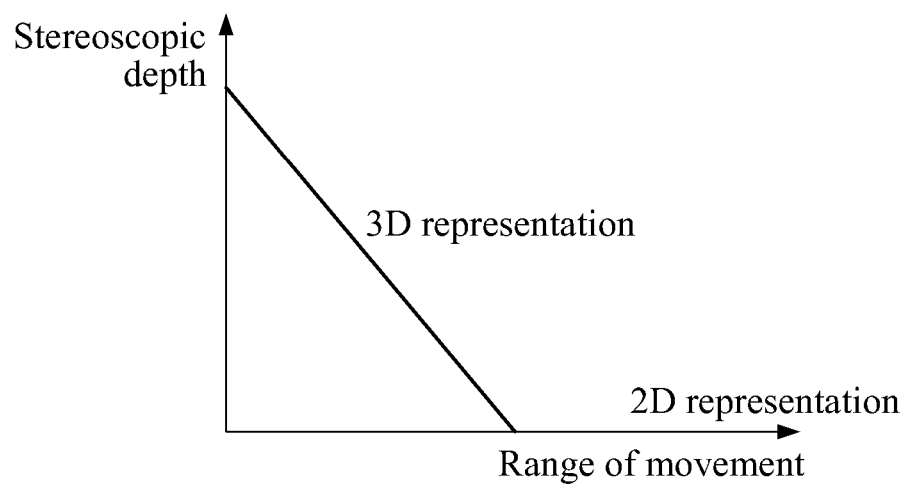
FIG. 7 is a graph illustrating an example of a change in a stereoscopic depth based on a range of a movement according to at least some example embodiments.

FIG. 7 is a graph illustrating an example of a change in a stereoscopic depth based on a range of a movement according to at least some example embodiments.

FIG. 7 illustrates a change in a stereoscopic depth based on a range of a movement of a user calculated by the display apparatus 100 of FIG. 1. When the range of the movement is equal to or less than a preset threshold, the display apparatus 100 may adjust the stereoscopic depth and may provide a 3D image. A period of time required to generate a left eye image and a right eye image may be reduced and thus, a difference between actual eye positions of the user and eye positions intended for rendering may be reduced.

However, when the range of the movement exceeds the preset threshold, a degradation in an image quality due to crosstalk may not be prevented, or, alternatively, reduced to a desirable level, only by adjusting the stereoscopic depth. Accordingly, when the range of the movement exceeds the preset threshold, the display apparatus 100 may change the 3D image rendering scheme to the 2D image rendering scheme, and may provide the same images that do not have a stereoscopic depth to eyes of the user.

Figure 8:
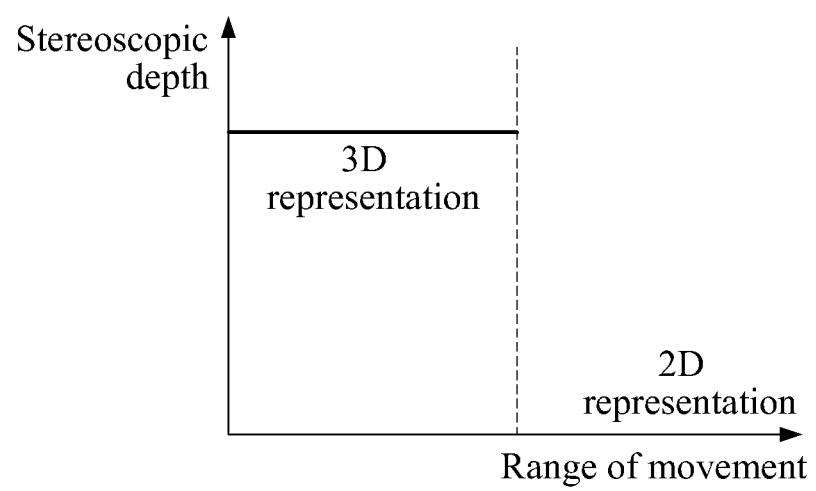
FIG. 8 is a graph illustrating another example of a change in a stereoscopic depth based on a range of a movement according to at least some example embodiments.

FIG. 8 is a graph illustrating another example of a change in a stereoscopic depth based on a range of a movement according to at least some example embodiments.

FIG. 8 illustrates a change in a stereoscopic depth based on whether a user moves determined by the display apparatus 200 of FIG. 2. The display apparatus 200 may compare eye movement information to a threshold, and may determine whether the user moves.

For example, when the user moves, the display apparatus 200 may select a 2D image rendering scheme. When the user does not move, the display apparatus 200 may select a 3D image rendering scheme.

When it is determined that the user is moving, the display apparatus 200 may select the 2D image rendering scheme, instead of the 3D image rendering scheme, using the selector 220. Thus, it is possible to prevent an image quality from being degraded due to crosstalk, instead of providing a 3D image.

Unlike the display apparatus 100 of FIG. 1, the display apparatus 200 may provide a left eye image and a right eye image that have a reference or, alternatively, predetermined disparity, instead of adjusting a stereoscopic depth when a 3D image is provided. The display apparatus 200 may select either the 3D image rendering scheme or the 2D image rendering scheme, and may provide a 3D image or a 2D image. However, according to at least some example embodiments, the display apparatus 200 may not adjust a stereoscopic depth of the 3D image.

Figure 9:
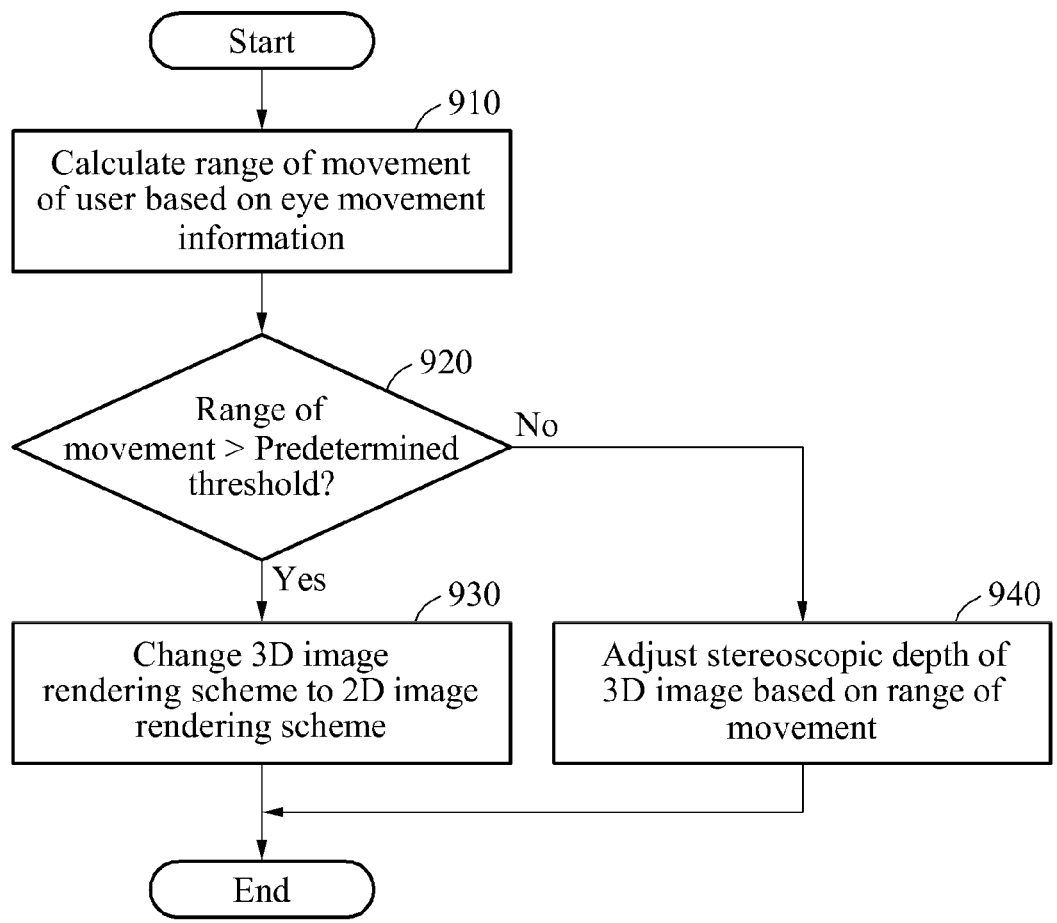
FIG. 9 is a flowchart illustrating an example of an operating method of a display apparatus according to at least some example embodiments.

FIG. 9 is a flowchart illustrating an example of an operating method of a display apparatus according to at least some example embodiments. The operating method of FIG. 9 may be performed by the display apparatus 100 of FIG. 1.

Referring to FIG. 9, in operation 910, the movement range calculator 110 may calculate a range of a movement of a user based on eye movement information on movements of eyes of the user. The movement range calculator 110 may calculate the range of the movement based on at least one of eye position information and eye movement speed information.

In operation 920, the calculated range of the movement may be compared to a preset threshold. The threshold may be set based on at least one of a latency caused by eye tracking to acquire the eye movement information, a latency caused by generation of a left eye image and a right eye image to provide a 3D effect, and a latency caused by a 3D image rendering scheme. The eye movement information may include a period of time required to acquire a camera image, and a period of time required to calculate eye positions.

In operation 930, the renderer 130 may change the 3D image rendering scheme to a 2D image rendering scheme. When the range of the movement is equal to or greater than the preset threshold, a quality of a provided 3D image may be degraded. Accordingly, when the range of the movement exceeds a limit of a difference between actual eye positions of the user and eye positions intended for rendering, a 2D image may be provided so as to prevent a degradation in an image quality. The difference may be reduced by adjusting a stereoscopic depth.

When the range of the movement exceeds the preset threshold, the display apparatus 100 may change an image rendering scheme to the 2D image rendering scheme, not the 3D image rendering scheme, using the renderer 130. Thus, it is possible to prevent an image quality from being degraded due to crosstalk, instead of providing a 3D image.

In operation 940, the stereoscopic depth adjuster 120 may adjust a stereoscopic depth of a 3D image based on the range of the movement. The stereoscopic depth adjuster 120 may adjust a disparity between a left eye image and a right eye image provided to the user, and may adjust the stereoscopic depth of the 3D image.

The stereoscopic depth adjuster 120 may reduce a period of time required to generate the left eye image and the right eye image by adjusting the disparity between the left eye image and the right eye image. Thus, it is possible to reduce a difference between actual eye positions of the user and eye positions intended for rendering. The stereoscopic depth adjuster 120 may adjust the stereoscopic depth based on the range of the movement and thus, it is possible to prevent the image quality from being degraded due to crosstalk.

Figure 10:
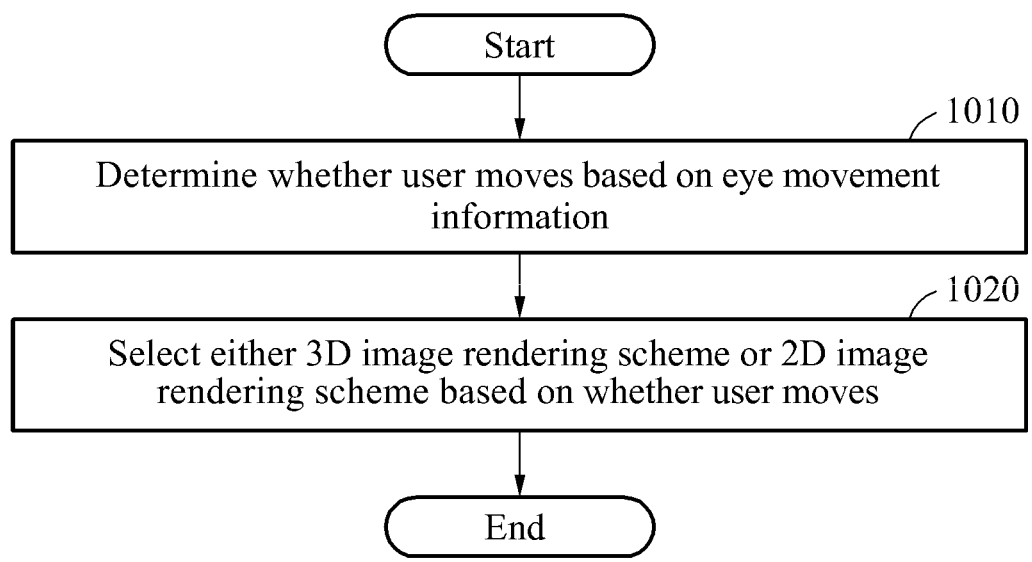
FIG. 10 is a flowchart illustrating another example of an operating method of a display apparatus according to at least some example embodiments.

FIG. 10 is a flowchart illustrating another example of an operating method of a display apparatus according to at least some example embodiments. The operating method of FIG. 10 may be performed by the display apparatus 200 of FIG. 2.

Referring to FIG. 10, in operation 1010, the movement determiner 210 may determine whether a user moves based on eye movement information. For example, the movement determiner 210 may determine whether the user is moving or substantially stationary based on the eye movement information.

In operation 1020, the selector 220 may select either a 2D image rendering scheme or a 3D image rendering scheme based on whether the user moves. When the user moves, the selector 220 may select the 2D image rendering scheme. When the user does not move, the selector 220 may select the 3D image rendering scheme.

When it is determined that the user is moving, the display apparatus 200 may select the 2D image rendering scheme, instead of the 3D image rendering scheme, using the selector 220. Thus, it is possible to prevent an image quality from being degraded due to crosstalk, instead of providing a 3D image.

Any or all units and/or modules described herein (e.g., the display apparatus 100, the movement range calculator 110, the stereoscopic depth adjuster 120, the renderer 130, the display apparatus 200, the movement determiner 210, the selector 220, the renderer 230, the display apparatus 510, and the display apparatus 610) may be implemented using hardware components, software components, or a combination thereof. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blu-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An operating method of a display apparatus, the operating method comprising:
    calculating a movement speed of a user based on eye movement information indicating movements of eyes of the user; and
    reducing a stereoscopic depth of a three-dimensional (3D) image based on the movement speed.

2. The operating method of claim 1, wherein the eye movement information includes eye movement speed information of the eyes.

3. The operating method of claim 1, wherein the reducing includes reducing the stereoscopic depth of the 3D image by reducing a disparity between a left eye image and a right eye image provided to the user.

4. The operating method of claim 3, wherein the reducing includes reducing the disparity between the left eye image and the right eye image in response to the movement speed increasing.

5. The operating method of claim 4, wherein the reducing includes reducing the disparity between the left eye image and the right eye image at a first ratio based on a rate of an increase in the movement speed.

6. The operating method of claim 1, further comprising:
    changing a 3D image rendering scheme to a two-dimensional (2D) image rendering scheme when the movement speed exceeds a first threshold.

7. The operating method of claim 6, further comprising:
    setting the first threshold based on at least one of
        a latency caused by eye tracking to acquire the eye movement information,
        a latency caused by generation of a left eye image and a right eye image to provide a 3D effect, or
        a latency caused by the 3D image rendering scheme.

8. The operating method of claim 1, wherein the reducing includes reducing the stereoscopic depth of the 3D image by reducing a disparity between a left eye image and a right eye image provided to the user.

9. A display apparatus comprising:
- a movement range calculator configured to calculate a movement speed of a user based on eye movement information indicating movements of eyes of the user; and
- a stereoscopic depth adjuster configured to reduce a stereoscopic depth of a three-dimensional (3D) image based on the movement speed.

10. The display apparatus of claim 9, wherein the stereoscopic depth adjuster is configured to reduce the stereoscopic depth of the 3D image by reducing a disparity between a left eye image and a right eye image provided to the user.

11. The display apparatus of claim 10, wherein the stereoscopic depth adjuster is configured to reduce the disparity between the left eye image and the right eye image in response to the movement speed increasing.

12. The display apparatus of claim 9, further comprising a renderer configured to change a 3D image rendering scheme to a two-dimensional (2D) image rendering scheme when the movement speed exceeds a threshold.

13. The display apparatus of claim 12, wherein the display apparatus is configured to set the threshold on at least one of
- a latency caused by eye tracking to acquire the eye movement information,
- a latency caused by generation of a left eye image and a right eye image to provide a 3D effect, or
- a latency caused by the 3D image rendering scheme.

14. An operating method of a display apparatus, the operating method comprising:
- calculating a range of a movement in a first direction of a user based on eye movement information indicating movements of eyes of the user;
- reducing a stereoscopic depth of a three-dimensional (3D) image based on the range of the movement in the first direction; and
- displaying the 3D image on a display,
- the first direction being a sideways direction relative to the display.

* * * * *